United States Patent
Henaut et al.

(10) Patent No.: US 9,157,021 B2
(45) Date of Patent: Oct. 13, 2015

(54) OPTIMIZED ENHANCED OIL RECOVERY METHOD WITH POLYMER PRESERVATION THROUGH SACRIFICIAL COMPOUND ADDITION

(75) Inventors: Isabelle Henaut, Rueil-Malmaison (FR); Khalil Hamdi, Paris (FR); Jean-Francois Argillier, Rueil-Malmaison (FR)

(73) Assignee: IFP ENERGIES NOUVELLES, Rueil-Malmaison Cedex (FR)

( * ) Notice: Subject to any disclaimer, the term of this patent is extended or adjusted under 35 U.S.C. 154(b) by 485 days.

(21) Appl. No.: 13/526,575

(22) Filed: Jun. 19, 2012

(65) Prior Publication Data
US 2013/0005615 A1    Jan. 3, 2013

(30) Foreign Application Priority Data
Jun. 29, 2011 (FR) ..................................... 11 02029

(51) Int. Cl.
*C09K 8/588* (2006.01)

(52) U.S. Cl.
CPC ..................................... *C09K 8/588* (2013.01)

(58) Field of Classification Search
CPC ....................................................... C09K 8/588
USPC ........................... 507/200, 211, 219, 225, 226
See application file for complete search history.

(56) References Cited

U.S. PATENT DOCUMENTS

| | | | |
|---|---|---|---|
| 3,684,014 A | 8/1972 | Norton et al. | |
| 3,707,187 A | 12/1972 | Knight | |
| 4,128,482 A | 12/1978 | Knight | |
| 2008/0194434 A1 | 8/2008 | Huff et al. | |

*Primary Examiner* — Frances Tischler
(74) *Attorney, Agent, or Firm* — Fitch, Even, Tabin and Flannery LLP

(57) ABSTRACT

The invention relates to an improved enhanced recovery method using polymers, wherein these polymers are preserved from mechanical degradation by adding an additive comprising sacrificial compounds. The sacrificial compounds are preferentially degraded instead of the active polymers, thus allowing optimized recovery of the oil in the petroleum reservoir. The sacrificial compounds can be polymers of same nature as the active polymers, but of higher molecular weight, or polymers of different nature having more fragile bonds. The sacrificial compound(s) is/are selected according to a lesser resistance to mechanical degradation, in comparison with the active polymers of the solution allowing enhanced recovery.

6 Claims, No Drawings

OPTIMIZED ENHANCED OIL RECOVERY METHOD WITH POLYMER PRESERVATION THROUGH SACRIFICIAL COMPOUND ADDITION

FIELD OF THE INVENTION

The present invention relates to an optimized enhanced recovery method using a sweep fluid comprising at least one polymer, wherein this (these) polymer(s) referred to as <<active>> are preserved from mechanical degradation by adding an additive comprising sacrificial compounds.

BACKGROUND OF THE INVENTION

Since the world energy crisis, it has become essential to be able to recover the maximum amount of hydrocarbons contained in underground formations.

Oil recovery using conventional techniques is limited to 33% on average. In order to increase this ratio and thus hope to make a petroleum reservoir profitable, enhanced recovery methods are implemented. These complex methods mainly consist in injecting specific fluids or heat.

Among the conventional recovery techniques, the most commonly used method consists in injecting, via an injection well, an aqueous fluid (generally water or brine). This fluid sweeps the underground formation so as to drive the hydrocarbons out of the pores of the rock where it is absorbed. Production wells allow a production effluent comprising a mixture of water, salts and hydrocarbons to be recovered.

There are several enhanced oil recovery methods. When compounds are added to the aqueous fluid injected, also referred to as sweep fluid, the method is referred to as tertiary chemical enhanced recovery. These chemical compounds are polymers, surfactants, alkaline compounds, or mixtures of such compounds. In relation to simple water or brine injection, the interest of the presence of a polymer is to increase the viscosity of the sweep fluid and therefore to improve the mobility ratio between the fluid injected and the hydrocarbons in place in the underground formation. The hydrocarbon recovery ratio is increased as a result of higher petroleum formation sweep efficiency. The polymers used in this method are generally polymers of high molecular mass used for their viscosifying properties.

Injecting polymers into the reservoir, which is commonly referred to as polymer flooding, is one of the most commonly used methods. These hydrosoluble polymers increase the viscosity of the water injected into the formation, thus modifying the oil/water mobility ratio. This favours a "piston" type sweep and results in a higher volumetric drainage efficiency of the oil in place.

The polymers are mixed at the surface and injected into the injection wells. They consist of structures of high molecular mass, typically above $10^6$ g/mol. This fundamental characteristic is at the origin of their viscosifying power, but it also explains their main drawback, i.e. their mechanical degradation.

During the injection of polymers into the reservoir, the fluids displaced are in fact subjected to high shears and elongational flows, notably in the initial injection unit, the nozzles and the pumps, constrictions in the reservoirs and around the wells thus leading to partial degradation of the polymers and to an inherent limitation of their efficiency.

A solution to this problem has been unexpectedly found by limiting the mechanical degradation of the polymer solutions commonly used in EOR methods, by adding a small amount (of the order of some ppm by weight in relation to the aqueous phase) of a second variety of polymers having either a higher molecular mass or more fragile bonds. These additives, also referred to as sacrificial agents or sacrificial compounds in the description below, are preferentially degraded, dissipating enough energy to protect the "active" polymers.

DESCRIPTION OF THE INVENTION

Summary of the Invention

The invention relates to an enhanced oil recovery method using injection of a solution comprising at least one active polymer into an oil well, wherein an additive comprising a sacrificial polymer whose mechanical degradation is preferential in relation to the active polymers is added to the solution of active polymers in a sufficient proportion to limit the mechanical degradation of the active polymers.

The sacrificial polymer is preferably selected according to the ability of the sacrificial polymer to preserve the active polymer from mechanical degradation quantified by the gain on the degradation percentage of the active polymer, defined as follows:

$$\text{gain} = \% \, deg - \frac{\% \, deg_{AS}}{\% \, deg},$$

with:

$$\% \, deg = 1 - \frac{\eta_{dégradé}}{\eta_{int}} \text{ and } \% \, deg_{AS} = 1 - \frac{\eta_{dégradé_{AS}}}{\eta_{int_{AS}}}$$

and:

$\eta_{dégradé}$ corresponds to the viscosity of the polymer solution after mechanical degradation via the capillary shear device, $\eta_{int}$ corresponds to the initial viscosity of the polymer solution, $\eta_{dégradé_{AS}}$ corresponds to the viscosity of the polymer solution containing the sacrificial agent after mechanical degradation via the capillary shear device, $\eta_{int_{AS}}$ corresponds to the initial viscosity of the polymer solution containing the sacrificial agent, $\eta_{int}$ and $\eta_{dégrandé}$, as well as $\eta_{int_{AS}}$ and $\eta_{dégrandé_{AS}}$ are measured via the rheometer in cone-plate geometry.

The gain on the degradation percentage is preferably higher than 10%, and more preferably higher than 30%.

The proportion of sacrificial polymer advantageously ranges between 5 and 500 ppm by weight in relation to the aqueous phase.

In an embodiment, the sacrificial polymer is a polymer of same nature as at least one of the active polymers and of higher molecular mass. In this case, the molecular mass of the sacrificial polymer can be at least 1.5 times as high as that of the active polymer of same nature.

In another embodiment, the sacrificial polymer is a polymer of different nature in relation to the active polymer(s) and it comprises more fragile bonds than the active polymer(s).

The sacrificial polymer can be selected from among polyacrylamides, hydrolyzed or not (PAM, HPAM), acrylamide copolymers with at least one sulfonated monomer, ethylene polyoxide (EPO), polysaccharides.

DETAILED DESCRIPTION

The invention relates to an enhanced oil recovery method improved by sweeping by means of a polymer solution (polymer flooding), wherein these polymers are preserved from mechanical degradation by adding an additive comprising sacrificial compounds. The sacrificial compounds are preferentially degraded instead of the active polymers, thus allowing optimized recovery of the oil in the production well. The sacrificial compounds can be polymers of same nature as the active polymers, but of higher molecular weight, or polymers of different nature having more fragile bonds. The sacrificial compound(s) is/are selected according to its/their lesser resistance to mechanical degradation in comparison with the active polymers of the solution allowing enhanced recovery.

The active polymers of the solution allowing enhanced recovery are generally selected from among:
- more or less hydrolyzed PAMs (polyacrylamides),
- acrylamide copolymers, sulfonated monomers and other monomers,
- xanthan,
- other natural polymers,
- any hydrosoluble polymer of molar mass above $10^6$ g/mol.

Selection of the Additive Comprising at Least One Sacrificial Compound

Criterion Used

Selection of the sacrificial compound(s) to be added to a given solution of active polymers is conditioned by various factors, notably the nature, the molecular mass, the degradation proportion and/or kinetics under the conditions of the well or of the active polymers.

Mechanical degradation tests were carried out on a capillary shear device constructed according to the instructions of the American Petroleum Institute (API), "Evaluation of shear stability of polymer solution" section. The degradation kinetics was evaluated by measurement with a controlled stress rheometer in cone-plate geometry.

The main criterion that can be selected for monitoring the ability of the sacrificial compound (generally a sacrificial polymer) to preserve the active polymer from mechanical degradation is the gain on the degradation percentage thereof, defined as follows:

1) Degradation percentage of the active polymer:

$$\% \ deg = 1 - \frac{\eta_{dégradé}}{\eta_{int}}$$

2) Degradation percentage of the active polymer in the presence of a sacrificial agent:

$$\% \ deg_{AS} = 1 - \frac{\eta_{dégradé_{AS}}}{\eta_{int_{AS}}}$$

3) Gain on the degradation percentage provided by the presence of the sacrificial agent:

$$gain = \% \ deg - \frac{\% \ deg_{AS}}{\% \ deg},$$

with:

$$\% \ deg = 1 - \frac{\eta_{dégradé}}{\eta_{int}} \text{ and } \% \ deg_{AS} = 1 - \frac{\eta_{dégradé_{AS}}}{\eta_{int_{AS}}}$$

and $\eta_{dégradé}$ corresponds to the viscosity of the polymer solution after mechanical degradation via the capillary shear device, $\eta_{int}$ corresponds to the initial viscosity of the polymer solution, $\eta_{dégrandé_{AS}}$ corresponds to the viscosity of the polymer solution containing the sacrificial agent after mechanical degradation via the capillary shear device, $\eta_{int_{AS}}$ corresponds to the initial viscosity of the polymer solution containing the sacrificial agent, $\eta_{int}$ and $\eta_{dégrandé}$, as well as $\eta_{int_{AS}}$ and $\eta_{dégrandé_{AS}}$ are measured via the rheometer in cone-plate geometry.

Advantageously, the gain has to be greater than or equal to 10%, preferably greater than 30%.

Selection of the Sacrificial Compounds

The additives used in the method according to the invention can comprise two types of sacrificial compounds (case 1 and case 2 below).

Case 1: the sacrificial agent is of same nature as the "active" polymer, but with a higher molecular mass. The molecular mass of the sacrificial polymer must advantageously be at least 1.5 times as high as that of the active polymer of higher molecular mass, and preferably at least 2 times as high.

For example, if the active polymer is OPE (ethylene polyoxide) of molecular mass $4.10^6$ g/mol, the sacrificial polymer selected is: OPE of molecular mass twice as high: $8.10^6$ g/mol.

Case 2: the sacrificial agent contains more fragile bonds than the active polymer. For example, in the case of an active polymer containing C—C covalent bonds alternating with C—C bonds, a polymer comprising in its skeleton only C-C covalent bonds whose binding energy is lower can act as the sacrificial agent.

Examples of Sacrificial Polymers

For example, the sacrificial agent can be selected from among:

Polyacrylamides, hydrolyzed or not (PAM, HPAM) or any other type of polymer used in EOR type methods, ethylene polyoxide (EPO), polysaccharides, depending on the nature of the active polymer(s).

The additive comprising the sacrificial compound is advantageously added to the polymer flooding solution (sweep fluid) in a proportion ranging between 5 and 500 ppm by weight in relation to the aqueous phase.

EXAMPLES

The proportions are expressed in ppm by weight.

Case 1: sacrificial agent of same nature as the "active" polymer (i.e. comprising the same monomers), but of higher molecular mass active polymer: EPO (ethylene polyoxide) of molecular mass $4.10^6$ g/mol sacrificial polymer: EPO of molecular mass $8.10^6$ g/mol.

Using a sacrificial polymer (EPO of molecular mass $8.10^6$ g/mol) leads to a gain on the degradation percentage that is 43% at 3 bars and 27% at 6 bars.

| | Degradation percentage | |
|---|---|---|
| | 1000 ppm active polymer | 1000 ppm active polymer + 100 ppm sacrificial agent |
| 0 bars | 0 | 0 |
| 3 bars | 20.8 | 11.9 |
| 6 bars | 22.2 | 16.1 |

Case 2: sacrificial agent containing more fragile bonds than those present in the active polymer active polymer: EPO of molecular mass $4.10^6$ g/mol sacrificial polymer: HPAM (polyacrylamide) of molecular mass $18.10^6$ g/mol.

The EPO comprises in its skeleton C—O covalent bonds whose binding energy is 360 kJ/mol.

The HPAM contains only C-C covalent bonds whose binding energy is 348 kJ/mol.

Using a sacrificial polymer (HPAM of molecular mass $18.10^6$ g/mol) leads to a gain on the degradation percentage that is 45% for 100 ppm sacrificial agent at 3 bars, 89% for 200 ppm sacrificial agent at 3 bars, 19% for 100 ppm sacrificial agent at 6 bars and 55% for 200 ppm sacrificial agent at 6 bars.

| | Degradation percentage | | |
|---|---|---|---|
| | 750 ppm active polymer | 750 ppm active polymer + 100 ppm sacrificial agent | 750 ppm active polymer + 200 ppm sacrificial agent |
| 0 bars | 0 | 0 | 0 |
| 3 bars | 8.9 | 4.9 | 1.0 |
| 6 bars | 11.5 | 9.3 | 5.2 |

The inevrntion claimed is:

1. An enhanced oil recovery method comprising:
   injecting a solution into an oil well, said solution comprising:
   an active polymer; and
   a sacrificial polymer comprising monomers of the active polymer and having a higher molecular mass than the active polymer, the sacrificial polymer present in a sufficient proportion with respect to the active polymers to limit the mechanical degradation of the active polymers.

2. A method as claimed in claim 1, wherein the sacrificial polymer provides a gain on a degradation percentage of the active polymer, defined as follows:

$$\text{gain} = \% \, deg - \frac{\% \, deg_{AS}}{\% \, deg},$$

where:

$$\% \, deg = 1 - \frac{\eta_{dégradé}}{\eta_{int}} \text{ and } \% \, deg_{AS} = 1 - \frac{\eta_{dégradé_{AS}}}{\eta_{int_{AS}}}$$

and:

$\eta_{dégrandé}$ corresponds to the viscosity of the polymer solution after mechanical degradation via a capillary shear device, $\eta_{int}$ corresponds to the initial viscosity of the polymer solution, $\eta_{égrandé_{AS}}$ corresponds to the viscosity of the polymer solution containing the sacrificial agent after mechanical degradation via the capillary shear device, $\eta_{int_{AS}}$ corresponds to the initial viscosity of the polymer solution containing the sacrificial agent, $\eta_{int}$ and $\eta_{dégradé}$, as well as $\eta_{int_{AS}}$ and $\eta_{dégradé_{AS}}$ are measured via a rheometer in cone-plate geometry.

3. A method as claimed in claim 2, wherein the gain on the degradation percentage is higher than 10%.

4. A method as claimed in claim 3, wherein the gain on the degradation percentage is higher than 30%.

5. A method as claimed in claim 1, wherein the molecular mass of the sacrificial polymer is at least 1.5 times as high as that of the active polymer.

6. A method as claimed in claim 5, wherein the solution of active polymers comprises an aqueous phase, and
   wherein the proportion of sacrificial polymer ranges between 5 and 500 ppm by weight in relation to the aqueous phase of the solution of active polymers.

* * * * *